(12) United States Patent
Phillips et al.

(10) Patent No.: US 11,393,204 B2
(45) Date of Patent: Jul. 19, 2022

(54) MONITORING SYSTEMS AND METHODS

(71) Applicant: Capital One Services, LLC, McLean, VA (US)

(72) Inventors: Jeremy J. Phillips, Brooklyn, NY (US); Kurry Lu Tran, Brooklyn, NY (US)

(73) Assignee: Capital One Service, LLC, McLean, VA (US)

( * ) Notice: Subject to any disclaimer, the term of this patent is extended or adjusted under 35 U.S.C. 154(b) by 469 days.

(21) Appl. No.: 16/133,862

(22) Filed: Sep. 18, 2018

(65) Prior Publication Data

US 2020/0089959 A1   Mar. 19, 2020

(51) Int. Cl.
| | |
|---|---|
| *H04N 21/4627* | (2011.01) |
| *H04N 21/235* | (2011.01) |
| *H04N 7/18* | (2006.01) |
| *G06V 20/40* | (2022.01) |
| *G08B 13/196* | (2006.01) |
| *G06F 21/12* | (2013.01) |
| *G06F 21/60* | (2013.01) |
| *H04L 9/08* | (2006.01) |
| *G06V 20/52* | (2022.01) |

(52) U.S. Cl.
CPC ............ *G06V 20/41* (2022.01); *G06F 21/12* (2013.01); *G06F 21/602* (2013.01); *G06V 20/52* (2022.01); *G08B 13/196* (2013.01); *H04L 9/0819* (2013.01); *H04N 7/183* (2013.01); *H04N 21/235* (2013.01); *H04N 21/4627* (2013.01); *G06F 2221/0755* (2013.01)

(58) Field of Classification Search
CPC ... G06K 9/00718; G06F 21/12; G06F 21/602; G06F 2221/0755; G08B 13/196; H04L 9/0819; H04N 7/183; H04N 21/235; H04N 21/4627
See application file for complete search history.

(56) References Cited

U.S. PATENT DOCUMENTS

| | | | | |
|---|---|---|---|---|
| 2014/0368668 | A1* | 12/2014 | Sasabuchi | G01S 13/867 348/187 |
| 2015/0063628 | A1* | 3/2015 | Bernal | G06K 9/00771 382/103 |
| 2015/0312531 | A1* | 10/2015 | Samad | H04N 7/186 348/143 |
| 2018/0060653 | A1* | 3/2018 | Zhang | G06K 9/6215 |

(Continued)

*Primary Examiner* — Francis Geroleo
(74) *Attorney, Agent, or Firm* — DLA Piper LLP US (57) ABSTRACT

A processor may process a video feed of a monitored area. The processing may include attempting to decrypt the video feed using a temporally-varying digital rights management key in a state corresponding to a time at which the encrypted video feed was received and encountering a decryption error during the attempting. The processing may include comparing the video feed with an output feed from a secondary sensor to determine that at least one object is indicated in the monitored area by the output feed and not visible in the video feed. The processor may indicate a problem with the video feed. For example, the processor may indicate that the encrypted video feed has been altered prior to the receiving of the encrypted video feed due to the decryption error and/or that the video camera is malfunctioning due to the at least one object being not visible in the video feed.

8 Claims, 9 Drawing Sheets

(56) References Cited

U.S. PATENT DOCUMENTS

| | | | |
|---|---|---|---|
| 2018/0096576 A1* | 4/2018 | Anderholm | G08B 13/19695 |
| 2018/0157916 A1* | 6/2018 | Doumbouya | G06K 9/00268 |
| 2018/0302414 A1* | 10/2018 | Wagner | H04L 63/107 |
| 2018/0331824 A1* | 11/2018 | Racz | H04L 9/0825 |

* cited by examiner

MONITORING SYSTEMS AND METHODS

BACKGROUND

Sensors, such as cameras, may be used to monitor areas. For example, security cameras are often used to monitor secured areas, such as banks or areas around ATMs. Some individuals attempt to thwart such monitoring to avoid being detected in the secured area. For example, individuals can tamper with cameras to cause them to record a feed of a still image rather than of the area being monitored. In another example, individuals can tamper with data feeds from cameras to substitute loops of false footage for the real footage being captured and sent by the camera over a network.

SUMMARY OF THE DISCLOSURE

A monitoring system may include a video camera configured to generate a video feed of a monitored area, a secondary sensor configured to generate an output feed of the monitored area, a processor in communication with the video camera and the secondary sensor, and a non-transitory memory in communication with the processor. The memory may be configured to store instructions that, when executed by the processor, cause the processor to perform processing. The processing may include analyzing the output feed to determine that at least one object is present in the monitored area, analyzing the video feed to determine that the at least one object is not visible in the video feed, and indicating that the video camera is malfunctioning due to the at least one object being not visible in the video feed.

In some embodiments, the analyzing of the output feed may include generating a map of the secured area based on data in the output feed. The map may include at least one curvature in at least one portion of the map. The analyzing may include comparing the map of the secured area to a known empty map of the monitored area and detecting the at least one object based on the at one curvature being different from a known curvature in at least one portion of the known empty map corresponding to a same portion of the monitored area as the at least one portion of the map.

In some embodiments, the analyzing of the output feed may include generating a map of the secured area based on data in the output feed. The map may include at least one curvature in at least one portion of the map. The analyzing may include comparing the map of the secured area to a known empty map of the monitored area and detecting the at least one object based on the at one curvature being not present in at least one portion of the known empty map corresponding to a same portion of the monitored area as the at least one portion of the map.

In some embodiments, the analyzing of the output feed may include generating a map of the monitored area based on data in the output feed. The map may indicate the at least one object in at least one portion of the map. The analyzing of the video feed may include comparing the video feed to the map to determine that the at least one object is not visible in at least one portion of the video feed corresponding to a same portion of the monitored area as the at least one portion of the map.

In some embodiments, the system may include at least one transceiver in communication with the processor and configured to receive a signal from an external device indicating a position of the external device within the monitored area. The analyzing of the video feed may include determining that the external device is not visible in a portion of the video feed corresponding to a same portion of the monitored area as the position of the external device.

In some embodiments, the system may include at least one transceiver in communication with the processor and configured to receive a digital rights management key that changes over time. The processing may include encrypting the video feed using the digital rights management key and transmitting, by the at least one transceiver, the encrypted video feed to at least one playback device.

In some embodiments, the secondary sensor may include at least one of a transceiver, a radar sensor, a sonar sensor, and a lidar sensor.

In some embodiments, the analyzing of the video feed may include using a convolutional neural network to identify features within the monitored area that are visible in the video feed.

A fraud detection system may include a monitoring system and a playback system. The monitoring system may include a video camera configured to generate a video feed of a monitored area, a monitoring processor in communication with the video camera, a monitoring transceiver in communication with the monitoring processor, and a non-transitory monitoring memory in communication with the monitoring processor. The monitoring memory may be configured to store instructions that, when executed by the monitoring processor, cause the monitoring processor to perform processing. The processing may include receiving, by the monitoring transceiver, a digital rights management key that changes over time, encrypting the video feed using the digital rights management key, and transmitting, by the monitoring transceiver, the encrypted video feed. The playback system may include a playback processor, a playback transceiver in communication with the playback processor, and a non-transitory playback memory in communication with the playback processor. The playback memory may be configured to store instructions that, when executed by the playback processor, cause the playback processor to perform processing. The processing may include receiving, by the playback transceiver, the encrypted video feed, receiving, by the playback transceiver, the digital rights management key in a state corresponding to a time at which the encrypted video feed was received, attempting to decrypt the encrypted video feed using the digital rights management key received by the playback transceiver, encountering a decryption error during the attempting, and indicating that the encrypted video feed has been altered between the transmitting of the encrypted video feed and the receiving of the encrypted video feed due to the decryption error.

In some embodiments, the receiving by the monitoring transceiver may include receiving a plurality of new digital rights management keys over time. One of the digital rights management keys may be valid at a given time. The encrypting may include, at the given time, using the digital rights management key that is valid.

In some embodiments, the digital rights management key may be provided by a digital rights management server separate from the monitoring system and the playback system.

A method of detecting video feed problems may include receiving, at a processor, a video feed of a monitored area. The method may include performing processing, by the processor, on the video feed. The processing may include at least one of attempting to decrypt the video feed using a temporally-varying digital rights management key in a state corresponding to a time at which the encrypted video feed was received and encountering a decryption error during the attempting, and comparing the video feed with an output feed from a secondary sensor to determine that at least one object is indicated in the monitored area by the output feed and not visible in the video feed. The method may include indicating, by the processor, a problem with the video feed. The indicating may include at least one of indicating that the encrypted video feed has been altered prior to the receiving of the encrypted video feed due to the decryption error, and indicating that the video camera is malfunctioning due to the at least one object being not visible in the video feed.

In some embodiments, the method may include receiving, at the processor, the temporally-varying digital rights management key from a digital rights management server.

In some embodiments, the method may include receiving, at the processor, the output feed. The method may include analyzing, by the processor, the output feed to determine that the at least one object is present in the monitored area.

In some embodiments, the analyzing may include generating a map of the secured area based on data in the output feed. The map may include at least one curvature in at least one portion of the map. The analyzing may include comparing the map of the secured area to a known empty map of the monitored area. The analyzing may include detecting the at least one object based on the at one curvature being different from a known curvature in at least one portion of the known empty map corresponding to a same portion of the monitored area as the at least one portion of the map.

In some embodiments, the analyzing may include generating a map of the secured area based on data in the output feed. The map may include at least one curvature in at least one portion of the map. The analyzing may include comparing the map of the secured area to a known empty map of the monitored area. The analyzing may include detecting the at least one object based on the at one curvature being not present in at least one portion of the known empty map corresponding to a same portion of the monitored area as the at least one portion of the map.

In some embodiments, the method may include receiving, at the processor, a signal from an external device indicating a position of the external device within the monitored area. The method may include determining that the external device is not visible in a portion of the video feed corresponding to a same portion of the monitored area as the position of the external device.

In some embodiments, the method may include using a convolutional neural network to identify features within the monitored area that are visible in the video feed.

In some embodiments, the method may include analyzing the output feed to generate a map of the monitored area based on data in the output feed. The map may indicate the at least one object in at least one portion of the map. The comparing may include comparing the identified features with the map.

In some embodiments, the secondary sensor may include at least one of a radar sensor, a sonar sensor, and a lidar sensor.

DETAILED DESCRIPTION OF SEVERAL EMBODIMENTS

Figure 1:
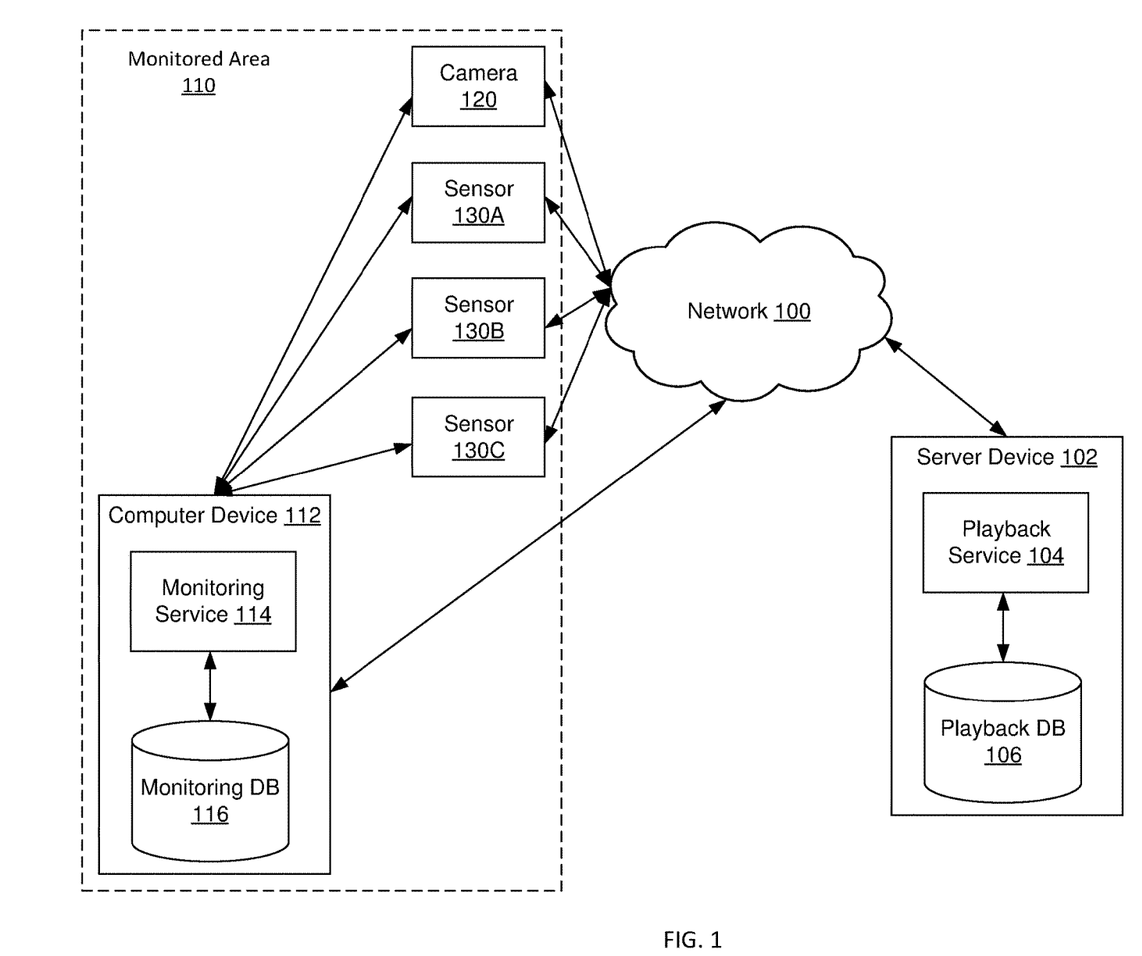
FIG. 1 shows a network and a monitored area according to an embodiment of the present disclosure.

FIG. 1 shows a network 100 and a monitored area 110 according to an embodiment of the present disclosure. Monitored area 110 may be any area monitored by one or more sensors. For example purposes, monitored area 110 may be considered as an area adjacent to an ATM, although monitored area 110 may be any space. The one or more sensors may include camera 120 and at least one additional sensor 130. Additional sensors 130 may include, for example, a transceiver, a radar sensor, a sonar sensor, a lidar sensor, and/or other types of sensors. Each sensor (e.g., camera 120 and additional sensor(s) 130) may be configured to observe the area where a user interacts with the ATM and/or other areas surrounding the ATM in the current example.

Sensors 120/130 may be configured to transmit data (e.g., video data from camera 120 and/or network/radar/sonar/lidar data from additional sensor 130) to other devices. For example, sensors 120/130 may be configured to transmit data to server device 102 through network 100 (e.g., the Internet or other wide area network) and/or to computer device 112 through a local network or connection.

Server device 102 and/or computer device 112 may be configured to monitor data from sensors 120/130. For example, computer device 112 may include monitoring service 114 and/or monitoring database 116. Monitoring service 114 may include hardware, software, and/or firmware for presenting data from sensors 120/130 to a user (e.g., security monitor screens) and/or generating alerts (e.g., alerting onsite security personnel of potential problems in monitored area 110). Monitoring database 116 may be configured to store data from sensors 120/130 (e.g., archiving sensor footage so that it is available for review in the event of a crime). Computer device 112 is depicted as a single device including a single monitoring service 114 and monitoring database 116 for ease of illustration, but those of ordinary skill in the art will appreciate that computer device 112 may be embodied in different forms for different implementations. For example, computer device 112 may include a plurality of computers and/or a plurality of monitoring service 114 and/or monitoring database 116 instances. Computer device 112 may be local to monitored area 110 as shown, or in some embodiments computer device 112 may be situated remotely and/or may communicate with sensors 120/130 through network 100 or another network.

Server device 102 may include playback service 104 and/or playback database 106. Playback service 104 may include hardware, software, and/or firmware for presenting data from sensors 120/130 to a user (e.g., security monitor screens). Playback database 116 may be configured to store data from sensors 120/130 (e.g., archiving sensor footage so that it is available for review in the event of a crime). Server device 102 is depicted as a single server including a single playback service 104 and playback database 106 for ease of illustration, but those of ordinary skill in the art will appreciate that server device 102 may be embodied in different forms for different implementations. For example, server device 102 may include a plurality of servers and/or a plurality of playback service 104 and/or playback database 106 instances. In general, server device 102 may communicate with sensors 120/130 through network 100 or another network.

Figure 2A:
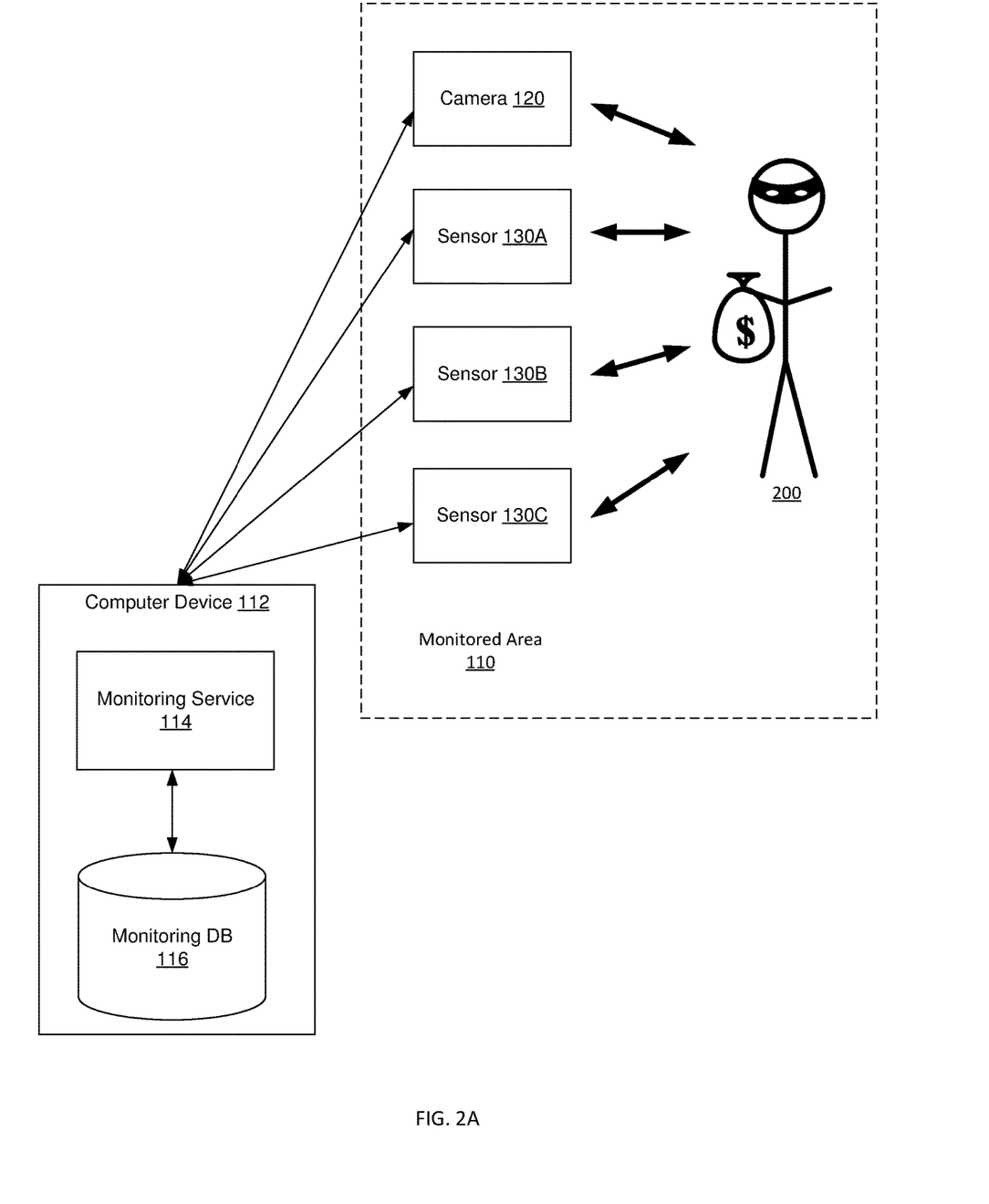
FIGS. 2A-2D show scenarios within the monitored area according to an embodiment of the present disclosure.

FIGS. 2A-2D show scenarios within monitored area 110 according to an embodiment of the present disclosure. For example, FIG. 2A shows a scenario wherein an object (e.g., a bank robber) 200 is within monitored area 110. In this scenario, camera 120 and each additional sensor 130 may detect object 200 and send data to monitoring service 114. Monitoring service 114 may display the data and/or store the data in monitoring database 116. In this scenario, monitoring service 114 may show object 200 on a monitor receiving the video feed and/or may provide additional indicia of the object (e.g., reporting from the additional sensor(s) 130).

Figure 2B:
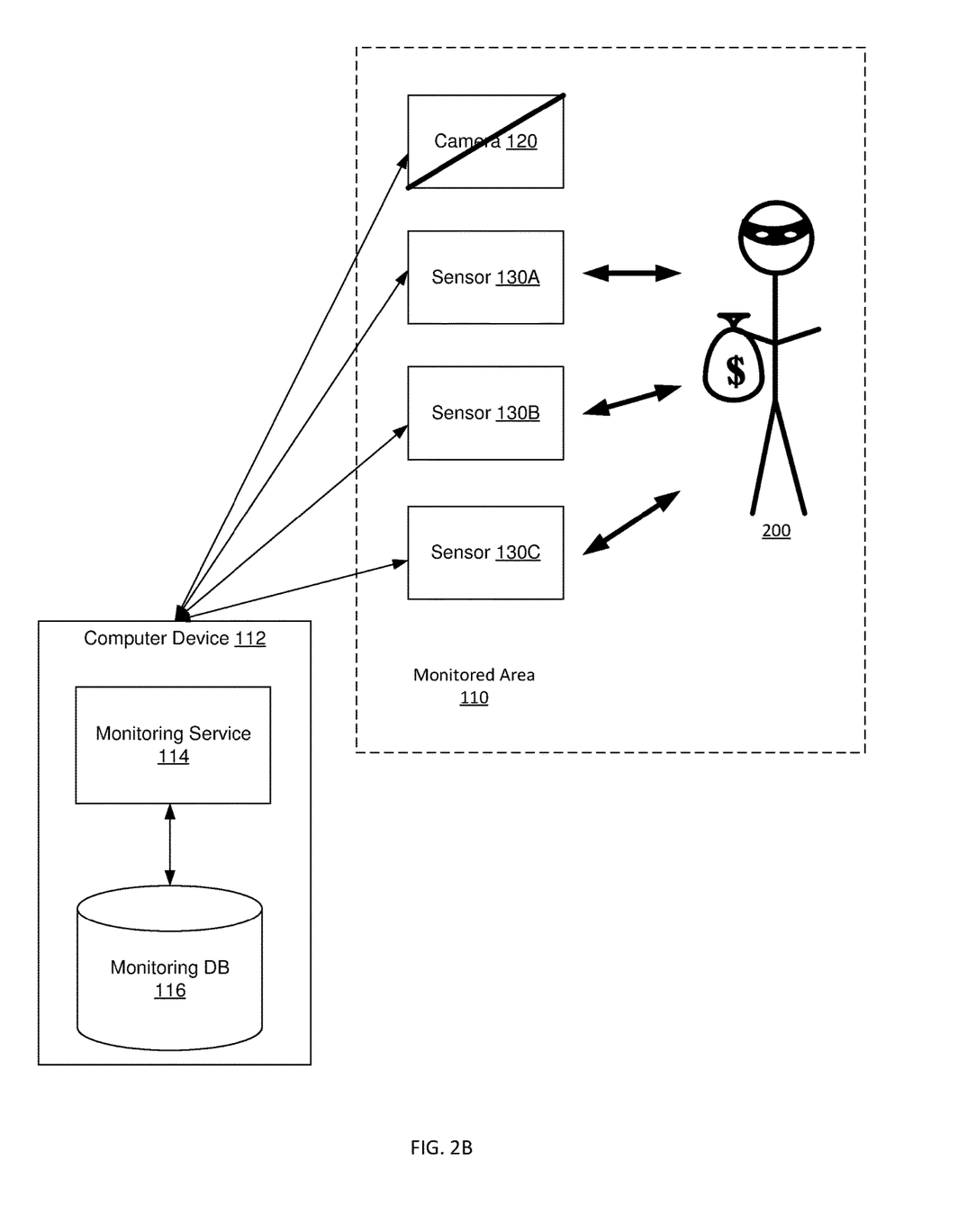

FIG. 2B shows a scenario similar to that of FIG. 2A except that in FIG. 2B, camera 120 has been disabled. For example, the bank robber or another individual may have previously tampered with camera 120. Camera 120 may have been disabled or may have been adjusted to provide what may appear to be a normal video feed, but is not an actual feed of monitored area 110. For example, camera 120 may be trained upon a still image of monitored area 110 without object 200 inside, or camera 120 may be modified to provide looped footage of monitored area 110 without object 200 inside. Accordingly, monitoring service 114 may not show object 200 on a monitor receiving the video feed. However, as described in detail below, additional sensor(s) 130 may detect object 200. Monitoring service 114 may report the presence of object 200 and/or may report a problem with camera 120 based on the data supplied by additional sensor(s) 130.

Figure 2C:
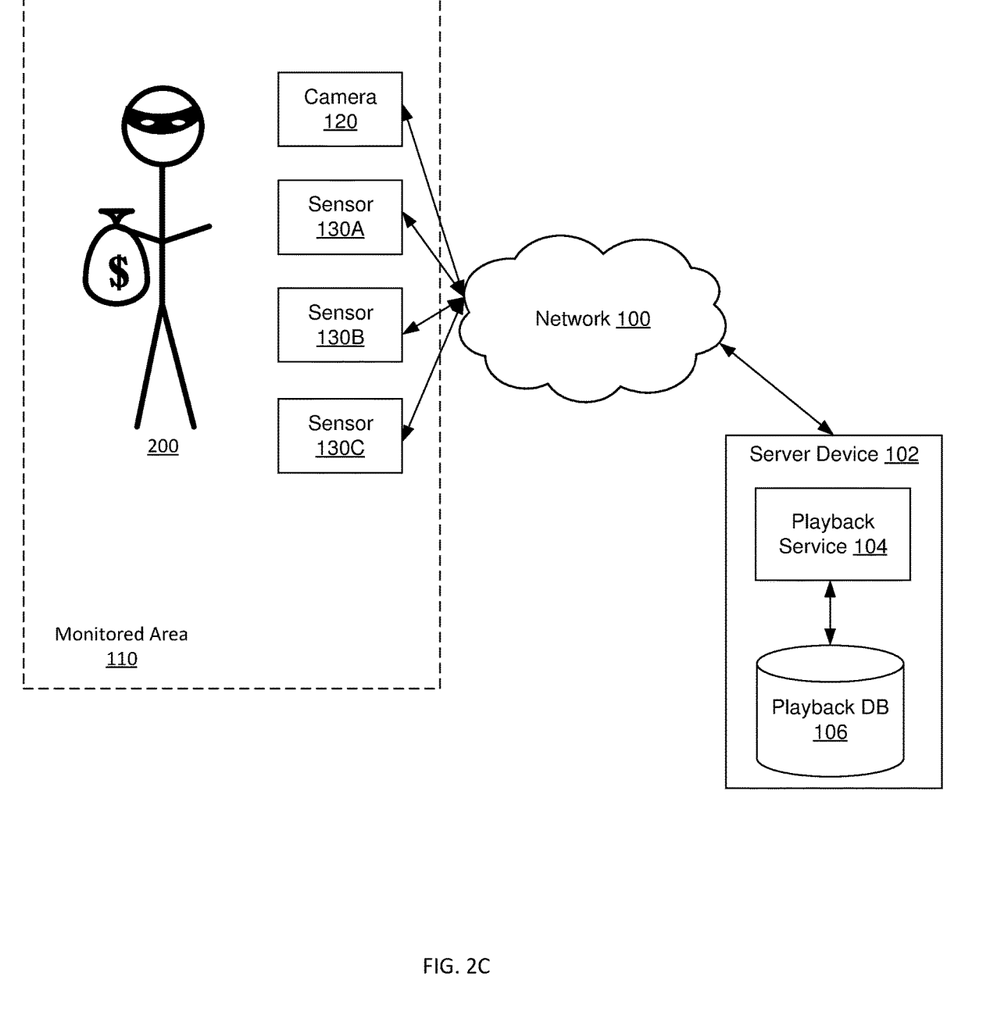

In another example, FIG. 2C shows a scenario wherein an object (e.g., a bank robber) 200 is within monitored area 110. In this scenario, camera 120 and each additional sensor 130 may detect object 200 and send data to server device 102 through network 100. Playback service 104 may display the data and/or store the data in playback database 106. In this scenario, playback service 104 may show object 200 on a monitor receiving the video feed and/or may provide additional indicia of the object (e.g., reporting from the additional sensor(s) 130).

Figure 2D:
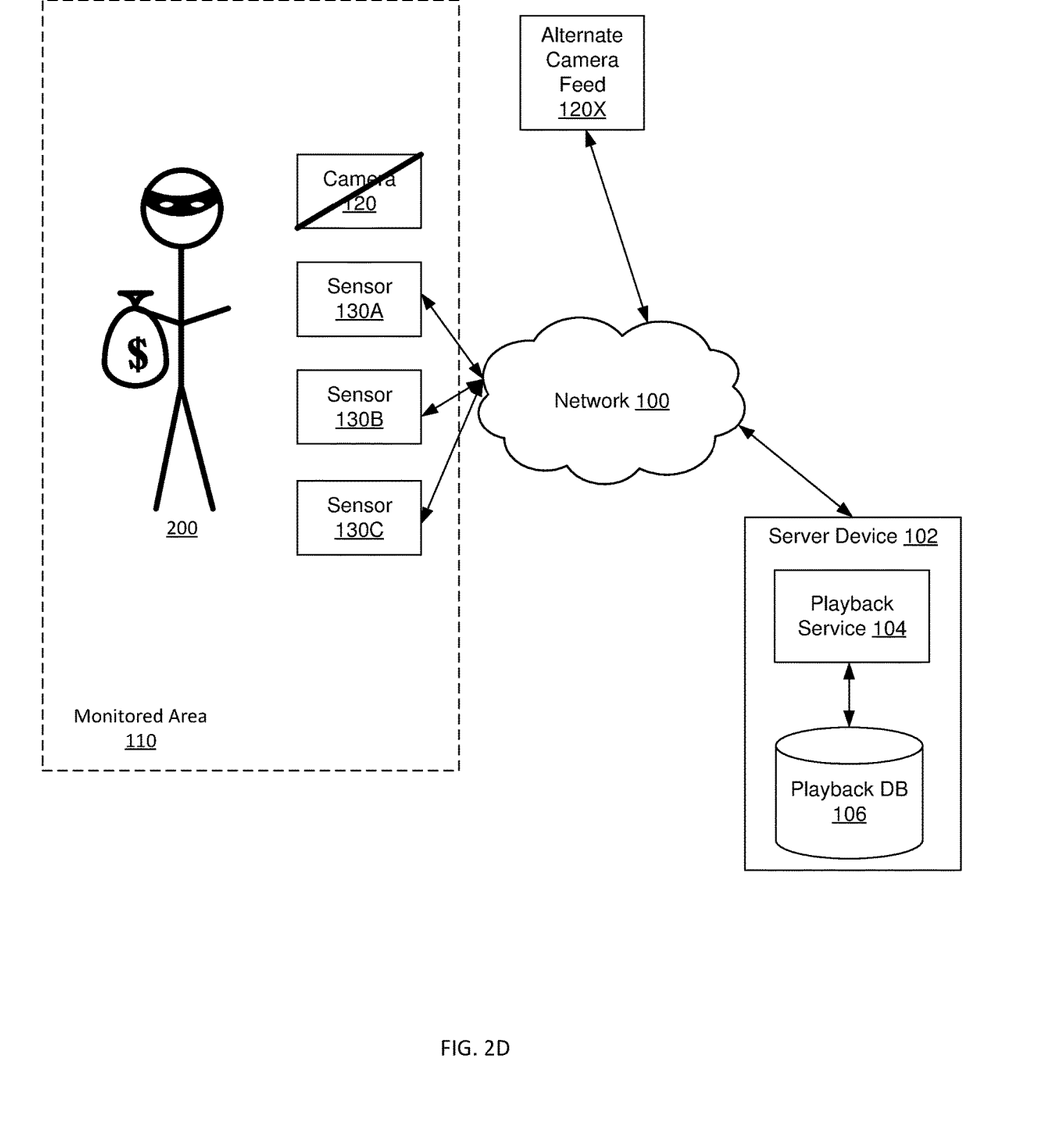

FIG. 2D shows a scenario similar to that of FIG. 2C except that in FIG. 2D, data from camera 120 has been replaced with data from an alternate camera feed 120X. For example, the bank robber or another individual may have previously discovered network traffic from camera 120 and routed alternate camera feed 120X to server device 102 in its place. Alternate camera feed 120X may provide what may appear to be a normal video feed, but is not an actual feed of monitored area 110. For example, alternate camera feed 120X may be a feed of a still image of monitored area 110 without object 200 inside, or alternate camera feed 120X may provide looped footage of monitored area 110 without object 200 inside. Accordingly, playback service 104 may not show object 200 on a monitor receiving the video feed. However, as described in detail below, data from camera 120 may be encoded in a way that allows playback service 104 to determine that it is genuine. Playback service 104 may report a problem with camera 120 based on discrepancies in the encoding of the data from alternate camera feed 120X.

Figure 3:
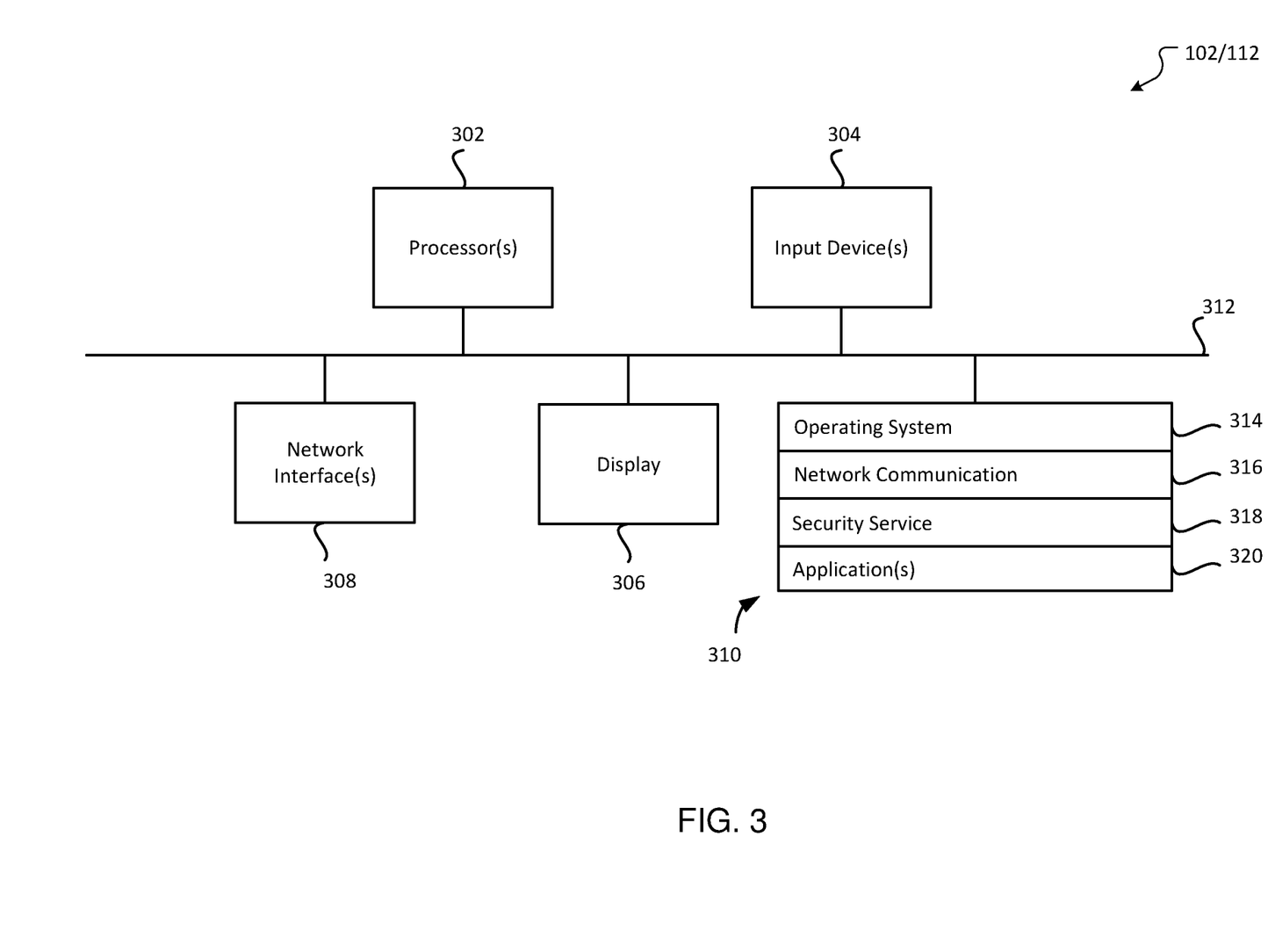
FIG. 3 shows a computing device according to an embodiment of the present disclosure.

FIG. 3 is a block diagram of an example computing device architecture, for example an architecture for server device 102 and/or computer device 112, that may implement various features and processes as described herein. The server device 102 and/or computer device 112 may be implemented on any electronic device that runs software applications derived from compiled instructions, including without limitation personal computers, servers, smart phones, media players, electronic tablets, game consoles, email devices, etc. Note that while a single server device 102 and/or computer device 112 is illustrated, the same architecture may be applied to multiple devices, and at least one separate server device 102 and/or computer device 112 may be provided in some cases. In some implementations, the server device 102 and/or computer device 112 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, telephony, etc.).

Security service instructions 318 can include instructions that perform monitoring and/or security functions as described herein. For example, security service instructions 318 may provide playback service 104, monitoring service 114, and/or other services as described herein.

Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 4:
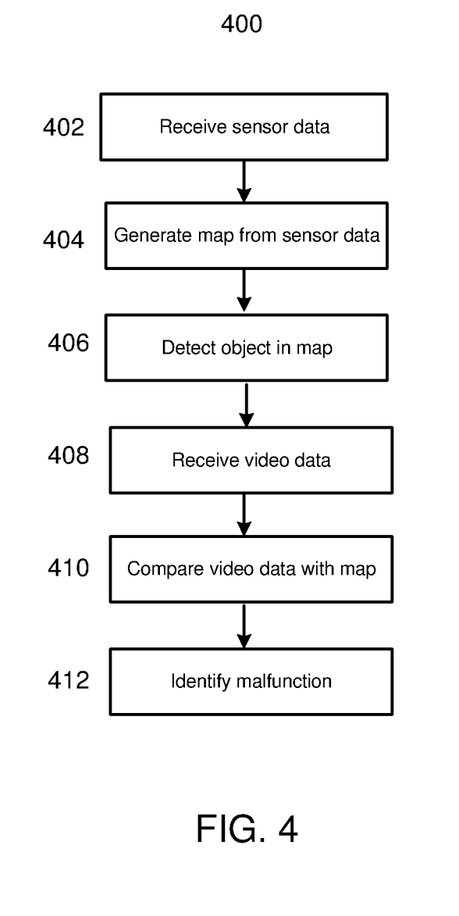
FIG. 4 shows a video feed malfunction detection process according to an embodiment of the present disclosure.

FIG. 4 shows a video feed malfunction detection process 400 according to an embodiment of the present disclosure. Computer device 112 may perform process 400 to determine whether video data being supplied by camera 120 is giving a true representation of the monitored area 110. In some embodiments, server device 102 may perform process 400 and receive data from camera 120 and/or sensors 130 through network 100. Apart from receiving the data through network 100 rather than through a local connection, server device 102 may perform process 400 similarly to the depiction of computer device 112 performing process 400 as given below.

At 402, computer device 112 may receive data from sensors 130. For example, monitoring service 114 may continuously and/or repeatedly receive data feeds sensors 130. Sensors 130 may provide data including representations of monitored area 110. For example, a radar sensor may provide a radar representation of objects in monitored area 110. A sonar sensor may provide a sonar representation of objects in monitored area 110. A lidar sensor may provide a lidar representation of objects in monitored area 110. In some embodiments, another sensor 130 may be a wireless transceiver configured to detect the presence of a mobile device in monitored area 110. For example, a mobile device with a banking app installed thereon may be configured to communicate with an ATM in monitored area 110, and a transceiver sensor 130 may report this communication to monitoring service.

At 404, computer device 112 may generate a map of monitored area 110. For example, monitoring service 114 may use data from sensors 130 to generate a map indicating objects detected by sensors 130 within monitored area 110. Monitoring service 114 may use any relevant detection methodology (e.g., object detection hardware, software, and/or firmware for radar, sonar, and/or lidar systems) to build the map.

At 406, computer device 112 may detect objects within the map. For example, monitoring service 114 may compare the map with previously-obtained map data stored in monitoring database 116. The stored map data may include one or more maps generated from sensor 130 data during times when monitored area 110 is known to be empty, for example. Monitoring service 114 may be able to detect differences in the current map as compared with the previously stored data. If differences are detected, monitoring service 114 may determine that one or more objects are present in monitored area 110. In some embodiments, monitoring service 114 may be able to detect quantity, position, and/or size of the objects. For transceiver data, monitoring service 114 may use GPS coordinates or other location indicators provided by a mobile device in communication with the transceiver to determine whether the mobile device is within monitored area 110.

At 408, computer device 112 may receive data from camera 120. For example, monitoring service 114 may continuously and/or repeatedly receive a data feed from camera 120. Camera 120 may provide video data including a visual representation of monitored area 110. In some embodiments, monitoring service 114 may receive the same video feed as is sent to a video monitor for security personnel locally and/or to server device 102 for display by playback service 104.

At 410, computer device 112 may compare the video data with the map. Monitoring service 114 may thereby determine whether objects detected at 406 are also shown by the video data. To make this comparison, monitoring service 114 may detect objects in the visual data, for example through the use of convolutional neural network processing and/or other known visual object detection techniques. In some embodiments, monitoring service 114 may detect quantity, position, and/or size of objects in the video data. In some embodiments, monitoring service 114 may construct a map of objects from the video data similar to the map(s) generated from other sensor 130 data at 406.

At 412, computer device 112 may determine whether there are problems with camera 120 based on the comparing at 410. For example, if the objects detected at 406 are the same objects detected in the video feed, the video feed may be accurate. However if monitoring service 114 detects an object at 406 that is not detected in the video data, monitoring service 114 may determine that the video feed does not include a true representation of monitored area 110. Monitoring service 114 may take one or more actions in response, such as alerting a user, locking down or otherwise disabling access to an ATM in monitored area 110, locking access to monitored area 110 (e.g., automatically locking a door), etc.

Figure 5:
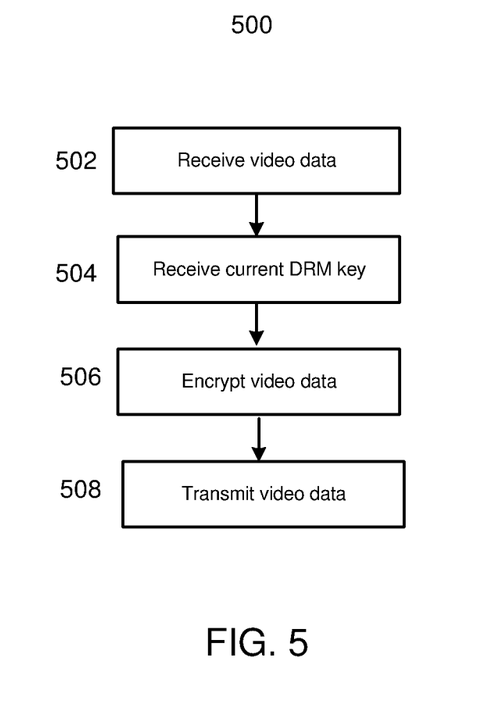
FIG. 5 shows a data encryption and transmission process according to an embodiment of the present disclosure.

FIG. 5 shows a data encryption and transmission process 500 according to an embodiment of the present disclosure. Computer device 112 may perform process 500 to prepare video data from camera 120 for transmission to server device 102 through network 100. By performing process 500, computer device 112 may enable server device 102 to detect tampering with the video data, which may occur during network 100 transmission, through process 600 as described below, for example.

At 502, computer device 112 may receive data from camera 120. For example, monitoring service 114 may continuously and/or repeatedly receive a data feed from camera 120. Camera 120 may provide video data including a visual representation of monitored area 110. In some embodiments, monitoring service 114 may receive the same video feed as is sent to a video monitor for security personnel locally.

At 504, computer device 112 may receive data from a digital rights management (DRM) service. For example, monitoring service 114 may be in communication with a DRM server through network 100. Monitoring service 114 may receive one or more keys (e.g., a public and private key pair) from the DRM server. Monitoring service 114 may request the keys by sending a request to DRM server and/or DRM server may send the keys to monitoring service 114 periodically. The keys may change periodically, so DRM server may send keys as they change and/or monitoring service 114 may request keys from time to time in order to ensure it has the current keys.

At 506, computer device 112 may encrypt the data from camera 120 using the keys received at 504. Monitoring service 114 may use the most recently received keys to encrypt the data to ensure that the data is encrypted with the keys currently being distributed by the DRM server.

At 508, computer device 112 may transmit the encrypted data over network 100. For example, monitoring service 114 may send the encrypted data to server device 102. Playback service 104 may attempt to decrypt the data and, if successful, may display the video feed to a user, for example. The encryption may allow playback service 104 to detect tampering with the video feed, as described below with respect to FIG. 6, for example.

Figure 6:
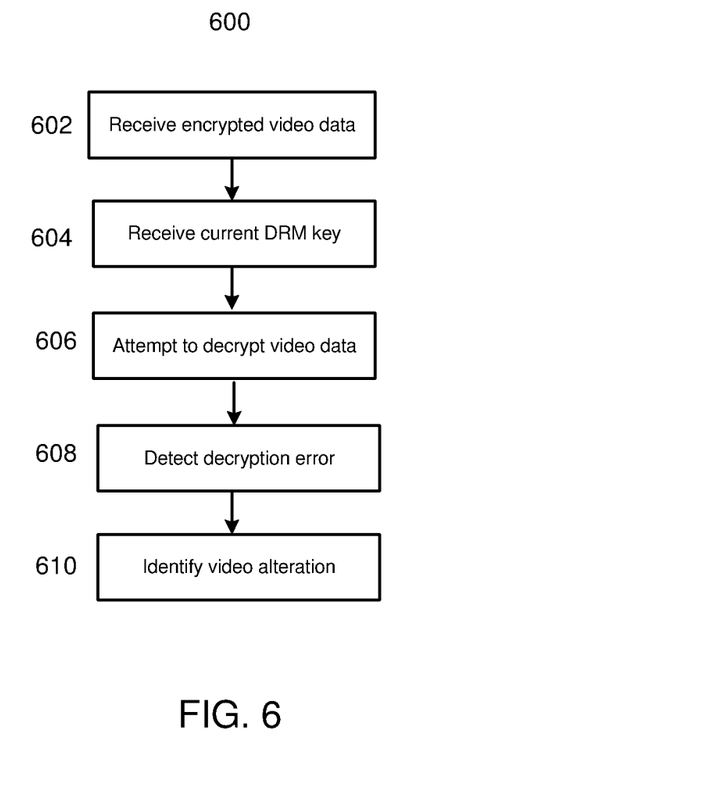
FIG. 6 shows a data feed malfunction detection process according to an embodiment of the present disclosure.

FIG. 6 shows a data feed malfunction detection process 600 according to an embodiment of the present disclosure. Server device 102 may perform process 600 to detect tampering with the video data, which may occur during network 100 transmission from computer device 112, for example. Assuming that the video data has been prepared (e.g., according to process 500 as described above), process 600 may reveal whether or not the video data has been altered.

At 602, server device 102 may receive encrypted video data. For example, playback service 104 may receive the encrypted video data transmitted at 508 by monitoring service 114 performing process 500. Playback service 104 may be configured to receive remotely gathered video data and display the video data for a user, archive the video data in playback database 106, and/or perform other processing using the video data.

At 604, server device 102 may receive data from the digital rights management (DRM) service. For example, playback service 104 may be in communication with the DRM server through network 100. Playback service 104 may receive one or more keys (e.g., a public and private key pair) from the DRM server. Playback service 104 may request the keys by sending a request to DRM server and/or DRM server may send the keys to playback service 104 periodically. The keys may change periodically, so DRM server may send keys as they change and/or playback service 104 may request keys from time to time in order to ensure it has the current keys At 606, server device 102 may attempt to decrypt the video data received at 602. For example, playback service 104 may use the most recently received keys to decrypt the video data. Because the video data was encrypted using the most recent keys provided by the DRM server, playback service 104 may be able to decrypt the video data if it is the same video data sent by monitoring service 114. In this case, playback service 104 may display the video data for a user, archive the video data in playback database 106, and/or perform other processing using the video data. Process 600 may end if playback service 104 successfully decrypts the video data.

At 608, server device 102 may detect a decryption error. For example, if the received video data was not encrypted using the keys most recently provided by the DRM server, playback service 104 may not be applying the correct key at 606. In one specific example, the video data received at 602 may be a loop of previously-transmitted video data that has been intercepted by a third party. The previously-transmitted video data may show monitored area 110 empty (e.g., with no people visible). The third party may create the loop and send it to playback service 104, in place of the real video data, in an attempt to make it look like monitored area 110 is empty (e.g., allowing a person to enter monitored area 110 undetected by playback service 104). However, the previously-transmitted video data may have been prepared using an expired key (e.g., because it was prepared according to process 500 using an earlier key, looped, and retransmitted after the key changed). Thus, the most recent DRM key will not work to decrypt the data.

At 610, server device 102 may determine that the video data has been altered. For example, playback service 104 may treat a failure to decrypt the data at 608 as an indication that the data has been altered. Playback service 104 may take one or more actions in response, such as alerting a user, locking down or otherwise disabling access to an ATM in monitored area 110, locking access to monitored area 110 (e.g., automatically locking a door), etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A monitoring system comprising:
   a video camera configured to generate a video feed of a monitored area;
   a secondary sensor configured to generate an output feed of the monitored area;
   a processor in communication with the video camera and the secondary sensor; and
   a non-transitory memory in communication with the processor, the memory being configured to store instructions that, when executed by the processor, cause the processor to perform processing comprising:
      analyzing the output feed to determine that at least one object is present in the monitored area, the analyzing comprising comparing the output feed with a known empty map of the monitored area to determine that the at least one object is not among a complete set of objects detected within the map and determining a location of the at least one object relative to the map;
      analyzing the video feed to attempt to detect the at least one object in the video feed, the analyzing comprising comparing the video feed with the known empty map to determine that the at least one object is not detected in at least one portion of the video feed corresponding to a same portion of the monitored area as the at least one portion of the known empty map;
      based on the analyzing of the video feed, failing to detect the at least one object in the video feed due to the comparing indicating that the location of the at least one object is empty within the video feed; and
      locking access to at least one location due to the at least one object not being detected in the video feed.

2. The system of claim 1, wherein the analyzing of the output feed comprises:
   generating a map of the secured area based on data in the output feed, the map comprising at least one curvature in at least one portion of the map;
   comparing the map of the secured area to the known empty map of the monitored area; and
   detecting the at least one object based on the at one curvature being different from a known curvature in at least one portion of the known empty map corresponding to a same portion of the monitored area as the at least one portion of the map.

3. The system of claim 1, wherein the analyzing of the output feed comprises:
   generating a map of the secured area based on data in the output feed, the map comprising at least one curvature in at least one portion of the map;
   comparing the map of the secured area to the known empty map of the monitored area; and
   detecting the at least one object based on the at one curvature being not present in at least one portion of the known empty map corresponding to a same portion of the monitored area as the at least one portion of the map.

4. The system of claim 1, wherein:
   the analyzing of the output feed comprises generating a map of the monitored area based on data in the output feed, the map indicating the at least one object in at least one portion of the map; and
   the analyzing of the video feed comprises comparing the video feed to the map to determine that the at least one object is not visible in at least one portion of the video feed corresponding to a same portion of the monitored area as the at least one portion of the map.

5. The system of claim 1, further comprising at least one transceiver in communication with the processor and configured to receive a signal from an external device indicating a position of the external device within the monitored area, wherein the analyzing of the video feed further comprises determining that the external device is not visible in a portion of the video feed corresponding to a same portion of the monitored area as the position of the external device.

6. The system of claim 1, further comprising at least one transceiver in communication with the processor and configured to receive a digital rights management key that changes over time, wherein the processing further comprises encrypting the video feed using the digital rights management key and transmitting, by the at least one transceiver, the encrypted video feed to at least one playback device.

7. The system of claim 1, wherein the secondary sensor comprises at least one of a transceiver, a radar sensor, a sonar sensor, and a lidar sensor.

8. The system of claim 1, wherein the analyzing of the video feed comprises using a convolutional neural network to identify features within the monitored area that are visible in the video feed.

* * * * *